United States Patent [19]

Jessop et al.

[11] 4,087,642
[45] May 2, 1978

[54] DIGITAL DATA COMMUNICATION SYSTEM

[75] Inventors: Anthony Jessop, Harlow; John Richard Dawson, Ipswich, both of England

[73] Assignee: International Standard Electric Corporation, New York, N.Y.

[21] Appl. No.: 780,203

[22] Filed: Mar. 22, 1977

Related U.S. Application Data

[63] Continuation of Ser. No. 686,630, May 14, 1976, abandoned, which is a continuation-in-part of Ser. No. 545,458, Jan. 30, 1975, abandoned.

[30] Foreign Application Priority Data

May 7, 1974 United Kingdom ............. 20035/74

[51] Int. Cl.$^2$ ............................................. H04J 3/00
[52] U.S. Cl. ........................... 179/15 BM; 325/38 A;
179/15 R
[58] Field of Search ....... 179/15 BM, 15 AC, 15 AV,
179/15 BW, 15 AF, 15 BA, 15.55 T, 15 R;
178/22, 50, 68; 325/38 R, 141, 321, 38 A

[56] References Cited

U.S. PATENT DOCUMENTS

| 3,337,691 | 8/1967 | Litchman | 179/15 BM |
| 3,461,245 | 8/1969 | Johannes et al. | 179/15 AF |
| 3,492,432 | 1/1970 | Schimpf | 179/15 BM |
| 3,611,141 | 10/1971 | Waters | 325/41 |
| 3,659,046 | 4/1972 | Angeleri et al. | 178/22 |

*Primary Examiner*—Douglas W. Olms
*Attorney, Agent, or Firm*—John T. O'Halloran; Alfred C. Hill

[57] ABSTRACT

There is disclosed an integrated multiplexer and code translator and an integrated demultiplexer and code translator for two binary data streams. The integrated multiplexer and code translator first multiplexes the two data streams and the result is code translated in accordance with the 4B3T (four binary bits to three ternary bits) translation practice as disclosed in U.S. Pat. No. 3,611,141. The converse takes place in the integrated demultiplexer and code translator.

27 Claims, 7 Drawing Figures

| TERNARY WORD | BINARY WORD | | | |
|---|---|---|---|---|
| | $A_1$ | $A_2$ | $B_1$ | $B_2$ |
| + − 0 | 1 | 1 | 0 | 0 |
| 0 − + | 0 | 1 | 0 | 0 |
| − 0 + | 0 | 0 | 1 | 0 |
| − + 0 | 1 | 0 | 0 | 1 |
| 0 + − | 1 | 0 | 1 | 0 |
| + 0 − | 1 | 0 | 0 | 0 |
| + 0 0 }<br>0 − 0 } | 1 | 1 | 0 | 1 |
| + − + }<br>− − + } | 0 | 1 | 1 | 0 |
| 0 0 + }<br>− 0 0 } | 0 | 0 | 0 | 1 |
| − + + }<br>− + − } | 0 | 0 | 0 | 0 |
| 0 + 0 }<br>0 0 − } | 1 | 0 | 1 | 1 |
| + + − }<br>+ − − } | 1 | 1 | 1 | 0 |
| 0 + + }<br>− 0 − } | 0 | 0 | 1 | 1 |
| + + 0 }<br>0 − − } | 1 | 1 | 1 | 1 |
| + 0 + }<br>− − 0 } | 0 | 1 | 0 | 1 |
| + + + }<br>− − − } | 0 | 1 | 1 | 1 |

DIGITAL DATA COMMUNICATION SYSTEM

CROSS-REFERENCE TO RELATED APPLICATIONS

This is a continuation of application Ser. No. 686,630, filed May 14, 1976 now abandoned which is a continuation-in-part application of Ser. No. 545,458, filed Jan. 30, 1975, now abandoned.

BACKGROUND OF THE INVENTION

This invention relates to digital data communication systems and more particularly to digital multiplexing and demultiplexing arrangements therefore.

SUMMARY OF THE INVENTION

An object of the present invention is to provide an improved digital multiplexing arrangement and a digital demultiplexing arrangement suitable for employment in a binary coded digital data communication system.

A feature of the present invention is the provision of a digital data communication system comprising: transmitter means including a plurality of sources of serial digital data streams, each of the streams having data encoded according to a first digital code; first means coupled to the sources to select from each of the streams a sub-group of successive digits; second means coupled to the first means for transferring the sub-groups collectively to form a first group of digits; third means coupled to the second means for translating the first group of digits into a second group of digits encoded according to a second digital code; and fourth means coupled to the third means for transmitting the second group of digits; and receiver means including fifth means coupled to the fourth means to receive the second group of digits; sixth means coupled to the fifth means for retranslating the second group of digits back into the first group of digits; seventh means coupled to the sixth means for dividing the retranslated first group of digits into the sub-groups; and eighth means coupled to the seventh means for recreating from the sub-groups the streams.

Another feature of the present invention is the provision of a digital data transmitter comprising: a plurality of sources of serial digital data streams, each of the streams having data encoded according to a first digital code; first means coupled to the sources to select from each of the streams a sub-group of successive digits; second means coupled to the first means for transferring the sub-groups collectively to form a first group of digits; third means coupled to the second means for translating the first group of digits into a second group of digits encoded according to a second digital code; and fourth means coupled to the third means for transmitting the second group of digits.

Still another feature of the present invention is the provision of a digital data receiver comprising: first means to receive a first group of digits encoded according to a first digital code derived from a second group of digits encoded according to a second digital code, the second group of digits being derived from a sub-group of successive digits of each of a plurality of serial digital data streams; second means coupled to the first means for translating the first group of digits back to the second group of digits; third means coupled to the second means for dividing the second group of digits into the sub-groups; and fourth means coupled to the third means for recreating from the sub-groups the streams.

A further feature of the present invention is the provision of a method of digital data communication for a plurality of serial digital data streams, each of the streams having data encoded according to a first digital code, comprising the steps of selecting from each of the streams a sub-group of successive digits; transferring the sub-groups collectively to form a first group of digits; translating the first group of digits into a second group of digits encoded according to a second digital code; transmitting the second group of digits; receiving the second group of digits; retranslating the second group of digits back into the first group of digits; dividing the retranslated first group of digits into the sub-groups; and recreating from the sub-groups the streams.

Still a further feature of the present invention is the provision of a method of digital data transmission for a plurality of serial digital data streams, each of the streams having data encoded according to a first digital code; selecting from each of the streams a sub-group of successive digits; transferring the sub-groups collectively to form a first group of digits; translating the first group of digits into a second group of digits encoded according to a second digital code; and transmitting the second group of digits.

Another feature of the present invention is the provision of a method of digital data reception for a first group of digits encoded according to a first digital code derived from a second group of digits encoded according to a second digital code, the second group of digits being derived from a sub-group of successive digits of each of a plurality of serial digital data streams; comprising the steps of receiving the first group of digits; translating the first group of digits back to the second group of digits; dividing the second group of digits into the sub-groups; and recreating from the sub-groups the streams.

Digital data is usually generated in binary form. However, such a signal may not be optimum for transmission which has the desired properties. These desired properties include:

(1) Radix optimized to the transmission media;
(2) Reduced low frequency content;
(3) Increased timing content; and
(4) Means of detecting errors.

These requirements lead to the choice of a code which frames the binary information into words. The information in these words is then conveyed by other words of different number of digits and/or radix. A common translation is the representation of words of four binary digits by words of three ternary digits. Such an arrangement is disclosed in U.S. Pat. No. 3,611,141, whose disclosure is incorporated herein by reference.

It is common for these transmission codes to have a large percentage of redundancy, usually in the range 10% to 40%. In the foregoing example, the percentage redundancy is $$1 - (4 \log 2)/3 \log 3) \times 100 = 16\%$$

This redundancy is necessary to achieve the desired properties stated above, especially to enable the low frequency content to be made small. Because of the redundancy there is usually some property in a code that can be used to enable the words to be correctly framed at the receiving end of the transmission link and, hence, the original binary recovered. Methods of correctly framing such codes are well known and include: checking for violations in translation rules which occur when the framing is mis-aligned, as described in U.S. Pat. No. 3,646,517, whose disclosure is incorporated herein by reference, derivation of framing from the digital sum variation, and looking for code words that cannot occur with correct framing. Because of the high redundancy, the reframing time can be very small.

This property is exploited in this invention.

In many applications, multiplexing (otherwise known as combining) of digital signals is required in addition to code translation. A feature of the present invention is the integration of these two functions. In current practice multiplexing and code translation are performed independently in that the digit streams to be multiplexed are first processed to form a serial binary digit stream which is then further processed in the code translator. When code translations are used in which binary words of '$n$' digits are regularly conveyed by '$m$' digit words of radix '$r$,' then the code translator can also act as a digital multiplexer. In the case where the signals to be multiplexed all have the same digit frequency and are bit synchronous, multiplexing can be achieved:

(i) Directly if the number of signals to be multiplexed equals '$n$';

(ii) by serial to parallel conversion in each input digit stream if the number of inputs is an exact sub-multiple of '$n$';

(iii) by serializing groups of inputs if the number of inputs is an exact multiple of '$n$'; and (iv) by a combination of (ii) and (iii) if there is no common factor between the number of inputs and '$n$'.

In the case where the signals to be multiplexed do not all have the same digit frequency, but nevertheless are harmonically related, multiplexing can be achieved:

(v) by serial to parallel conversion of the higher digit frequency signals if the aggregate digit frequency is exactly '$n$' times the lowest digit frequency; and (vi) by a combination of serial to parallel conversion and parallel to serial conversion for all other cases.

All the operations described in cases (i) to (vi) can be performed without generating a digit stream at the aggregate digit frequency.

At the receiving end of the transmission link the '$n$' digit binary words can be reconstructed by the receiving code translator using its own frame aligning mechanism. In cases (i), (ii) and (v) above the original signals can then be recovered without identifying information in the binary digit streams. In the other cases additional information may be required in the binary digit streams if a multi-word frame cannot be obtained from the receiving code translator. Even in the cases where additional binary multi-frame information is necessary the time to align the multi-frame from a nonaligned state can be significantly reduced if the multi-frame information is made coherent with the code translation frame, since the number of checks on the multi-frame search is reduced which reduces the time lost through simulation of the multi-frame information.

All the de-multiplexing operations can be performed by the inverse operation to that at the multiplexer; that is without generating a serial binary digit stream or clock at the aggregate binary digit rate. Initially the only timing signal at the receiving demultiplexer is usually a clock at the transmission digit rate $t$. The aggregate binary digit rate is $t \times n/m$, where $n/m$ is usually greater than unity. Without integration of the receiving code translator and the demultiplexer, a clock frequency $t \times n/m$ would have to be synthesized involving frequency multiplication. With integration all the necessary digit frequencies can be derived from the transmission rate clock by division, provided no frequency is greater than $t$.

In the previously mentioned cases (i) to (iv) where all multiplexed signals have the same digit frequency, the signals can be demultiplexed and an associated clock of the correct digit frequency derived by dividing the transmission rate clock by a factor $n/pm$, where $p$ is the number of multiplexed signals. In cases where $n/pm$ is an integer, a regular clock can be generated; in other cases the clock will in general be irregular.

In the previously mentioned cases (v) and (vi) where all multiplexed signals do not have the same digit frequency, the various clocks can be individually synthesized by dividing the transmission rate clock by a factor $(f/f_a)$ $(n/m)$, where $f$ is the digit frequency of the particular tributary signal and $f_a$ is the aggregate digit frequency of all the tributary signals.

Although in some of the cases described the reconstructed clocks at the demultiplexer are irregular, in many instances this is of little consequence. For example, when asynchronous signals are multiplexed, it is common to use the technique of pulse stuffing to achieve bit synchronism at the multiplexer — by adding redundant digits. At the demultiplexer these redundant digits are removed giving a signal with an irregular clock. The mechanism for smoothing the clock irregularities due to pulse stuffing can also smooth the irregularities due to the integrated multiplexing and code translation.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
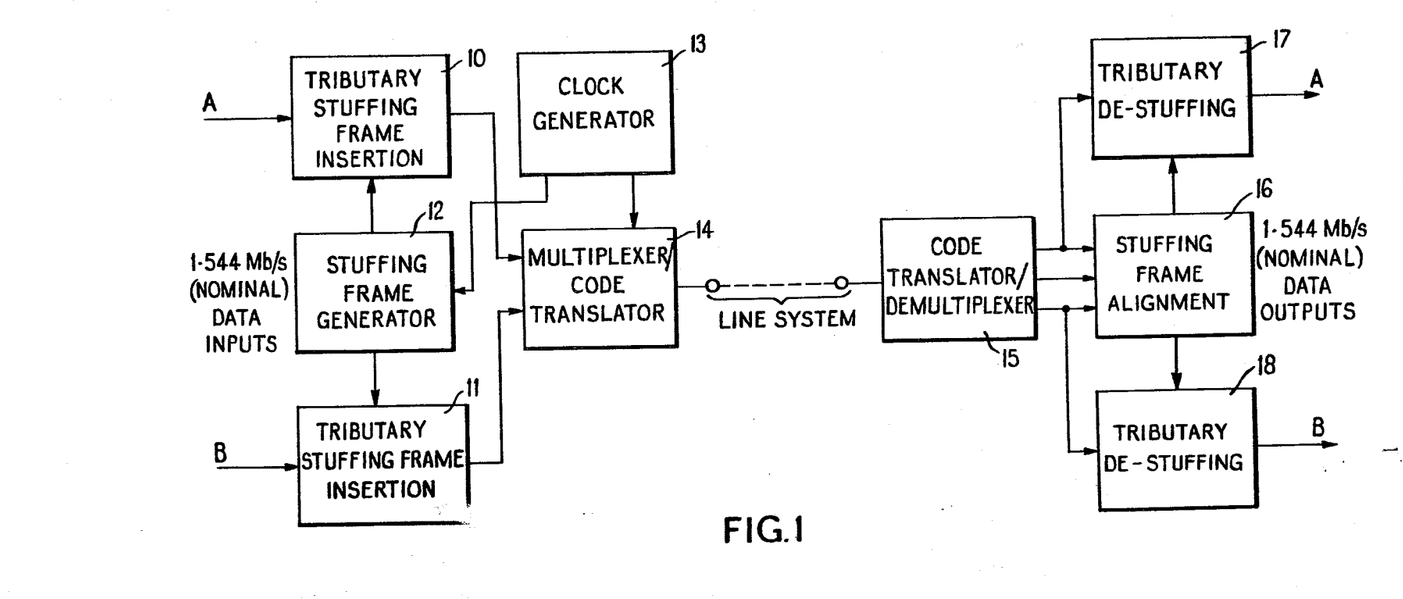
FIG. 1 illustrates a block diagram of a typical digital data communication system in accordance with the principles of the present invention.

In the general arrangement shown in FIG. 1 two asynchronous binary data streams A and B, each at a normal bit rate of 1.544 Mb/s, are multiplexed and transmitted over a common channel. By means of added digits in a superimposed frame, each of the two tributary digit streams is bought up to a common digit frequency using the pulse stuffing circuits 10 and 11; the stuffing frame generator 12 being common to both tributaries. The two, now synchronous, stuffed tributaries are combined in the multiplexer/code translator 14 which transmits a single digit stream to line. The receiving terminal performs the reverse operation, redundancy in the line code is used by the code translator/demultiplexer 15 to define the division into the two stuffed tributaries. Common stuffing frame alignment circuits 16 detects the stuffing frame and the tributaries then have the added stuffing and framing digits removed in the destuffing circuits 17 and 18. A smoothed clock is generated at each of the tributary binary digit rates to clock out the two 1.544 Mb/s signals.

Figure 2:
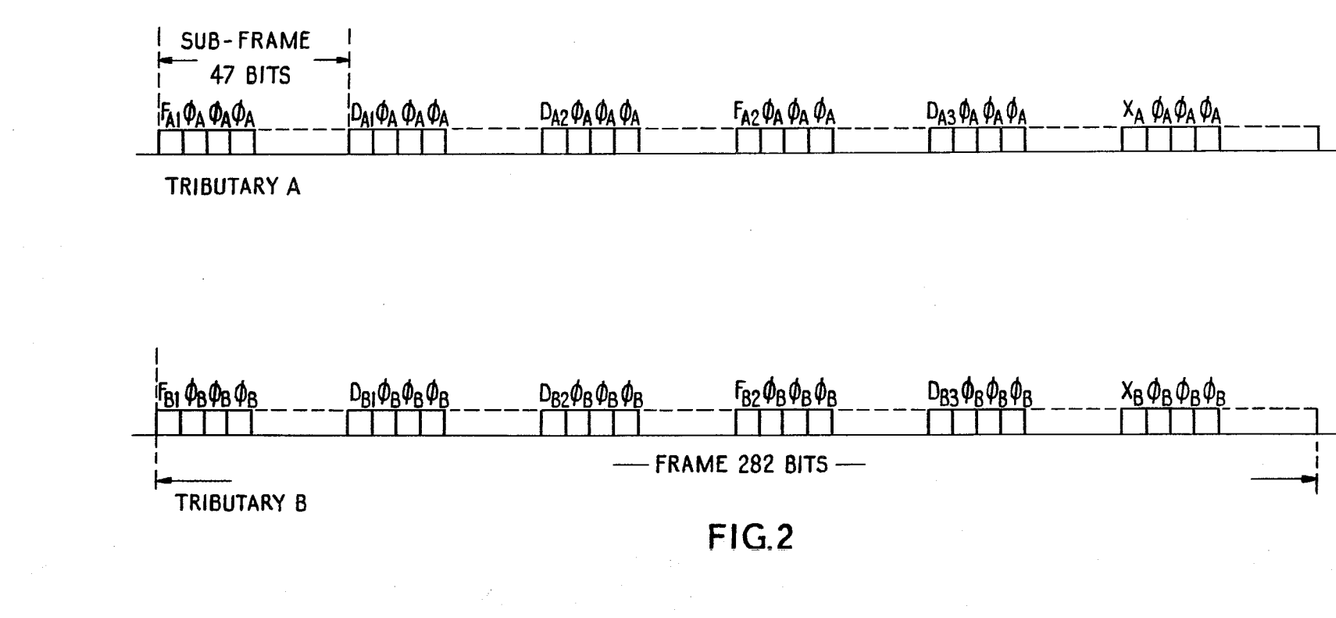
FIG. 2 illustrates a pulse stuffed tributary frame structure.

FIG. 2 shows diagrammatically the identical frame structures used for the stuffed tributaries. Each frame consists of six sub-frames of 47 bits, giving a total frame length of 282 bits. The sub-frames have 46 information bits and one framing bit which are allocated as follows. $\phi$ denotes a time slot for a data (information) bit. The frame alignment signal is when bits $F_{A1}$ and $F_{B1}$ are "11" and bits $F_{A2}$ and $F_{B2}$ are "00." Bits $D_{A1}$, $D_{A2}$ and $D_{A3}$ form the stuffing indicator for tributary A. "000" indicates "no stuffing" and "111" indicates "stuffing" in that frame. Similarly bits $D_{B1}$, $D_{B2}$ and $D_{B3}$ form the stuffing indicator for tributary B. The actual time slot available for stuffing in each frame is the first $\phi$ time slot following the third D bit in the frame. Bits $X_A$ and $X_B$ are used for two alarm or signalling channels. This frame structure results in a stuffed tributary bit rate of 1.580 Mb/s and a frame rate of 5.6028 kHz.

Figure 3:
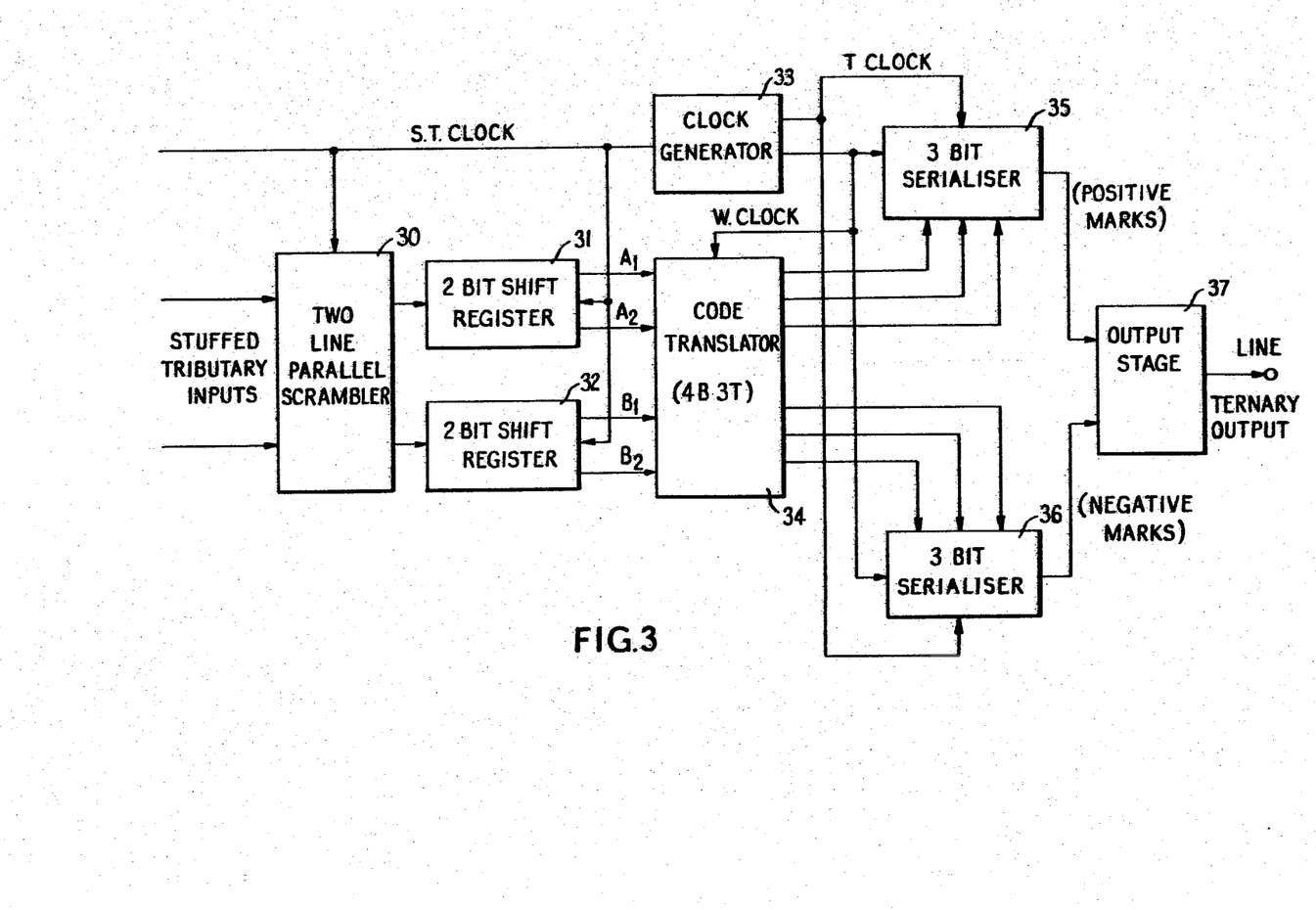
FIG. 3 illustrates in block form the integrated multiplexer/code translator portion of FIG. 1.
Figure 4:
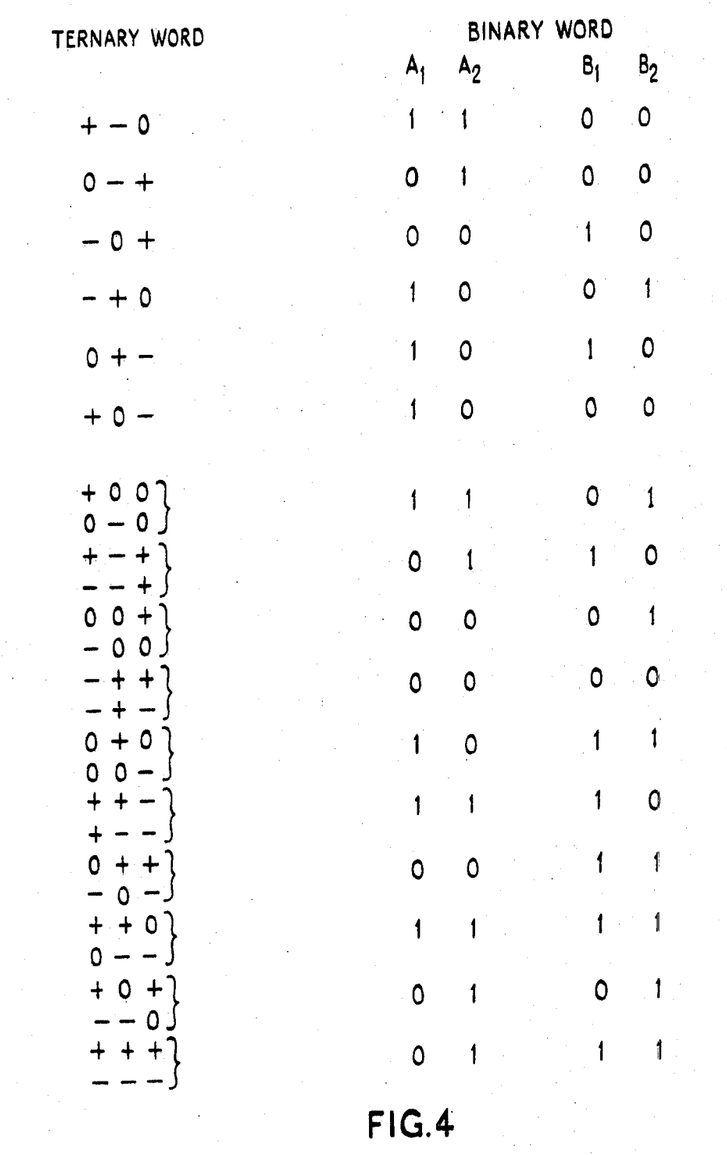
FIG. 4 illustrates the 4B3T code translation used in the code translator of FIG. 3.

FIG. 3 shows a functional block diagram for an integrated multiplexer and code translator for the application outlined above, the line code employed is 4B3T, an example of the four binary to three ternary class of translation already mentioned. The two stuffed tributaries are first scrambled in a ten stage, two line parallel scrambler 30. A suitable scrambler is disclosed in a first copending application, Ser. No. 553,349, filed Feb. 26, 1975, whose disclosure is incorporated herein by reference. The two scrambled streams are then deserialized in two 2-bit shift registers 31 and 32 so that data is presented to the translator 34 as 4-bit words. Translator 34 may be implemented as disclosed in the above-cited U.S. Pat. No. 3,611,141. The translator generates six outputs; one each for positive and negative marks for the first, second and third time slots of the 3-digit ternary word. The translation of the labelled inputs $A_1$, $A_2$, $B_1$, $B_2$ into their ternary equivalents is shown in FIG. 4.

The code translator also monitors the running digital sum of the output ternary signal and this is used to control the choice of a ternary word where alternative ternary words are available for a particular input binary word. The translator outputs are serialized in two groups of three in serializers 35 and 36 and the resultant two binary streams at ternary digit rate T control the output stage 37 which drives a single ternary digit stream to line. Stage 37 may be implemented like line circuit 206 of FIG. 3 of the above-cited U.S. Pat. No. 3,611,141 which is described at column 4, lines 29 to 35 thereof. Clocks at line digit rate T, stuffed tributary digit rate ST, and word rate W are all generated by division of a common source in the clock generator 33.

Figure 5:
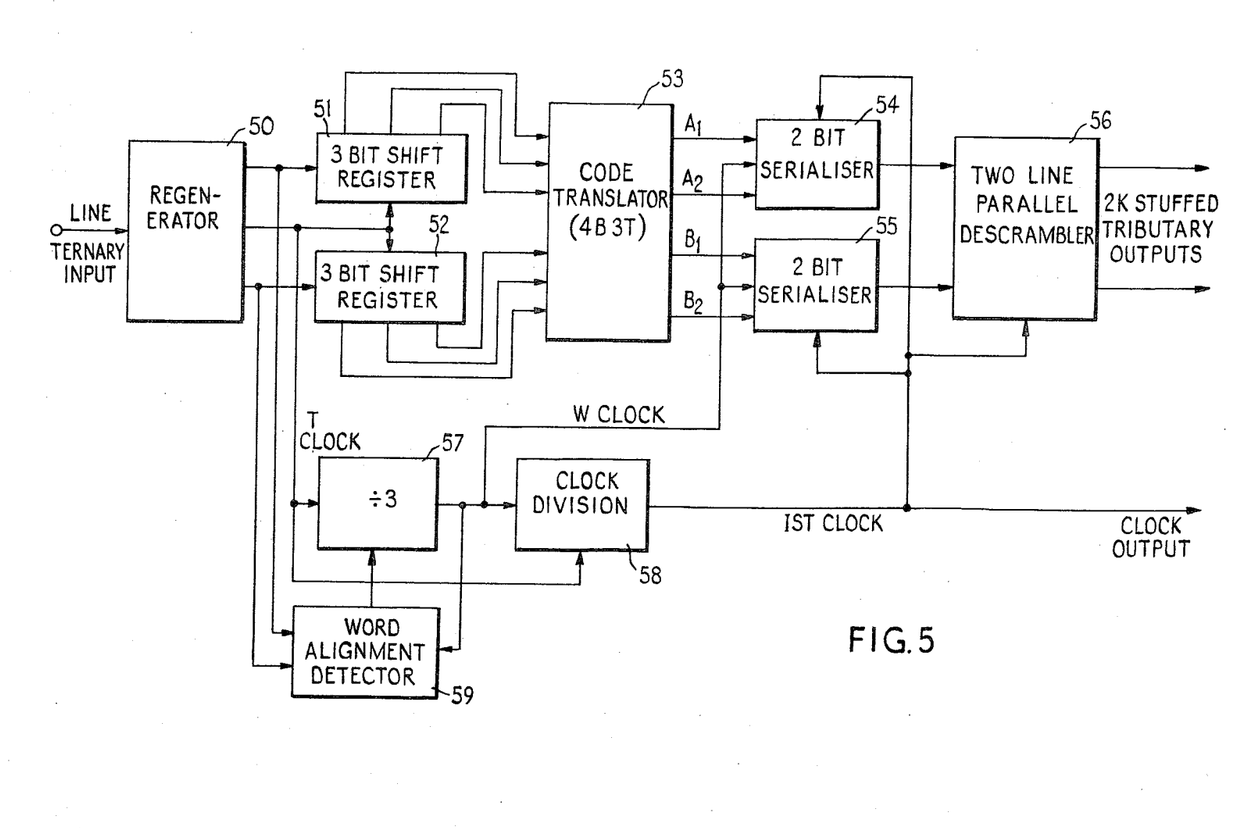
FIG. 5 illustrates in block form the integrated code translator/demultiplexer portion of FIG. 1.
Figure 7:
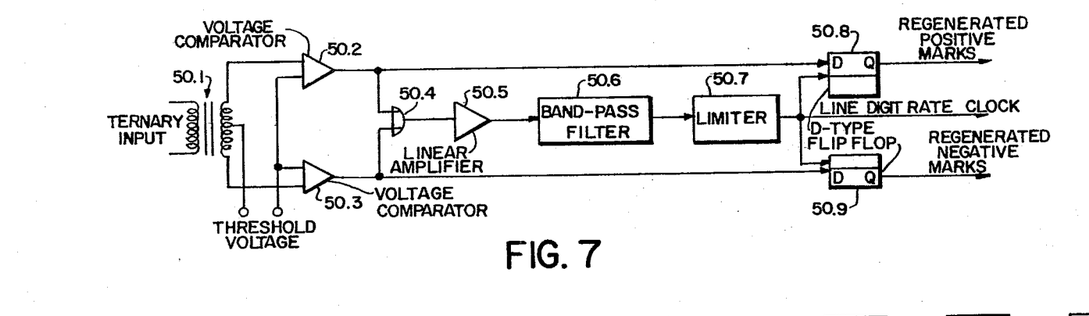
FIG. 7 illustrates in block form the regenerator of FIG. 5.

A functional block diagram for an integrated demultiplexer and code translator 15 of FIG. 1 is shown in FIG. 5. The regenerator 50 recovers a clock from the ternary digit stream at the ternary digit frequency and detects positive and negative marks which are represented by two binary digit streams identical to those existing in the transmitting terminal before the output stage. One example of an implementation of regenerator 50 is illustrated in FIG. 7 and includes a phase splitting transformer 50.1 which receives the ternary input signal. The positive and negative marks in the ternary signal are detected by voltage comparators 50.2 and 50.3 using a threshold voltage which is approximately one half of the peak amplitude of the ternary signal. The output signals of the comparators are binary signals which are combined in OR gate 50.4. Since the ternary input signal is composed of positive and negative pulses whose width is approximately half a digit period the output of OR gate 50.4 contains a frequency component at the line digit rate. This frequency component is selected by buffering the output signal of OR gate 50.4 with a linear amplifier 50.4, the output impedance of which is suitable for driving the narrow band-pass filter 50.6. The center frequency of filter 50.6 is tuned to the line digit rate and its phase transfer characteristic gives a phase shift of approximately 90° at the line digit frequency. The variable amplitude sinusoidal output of filter 50.6 is changed into a binary square wave signal of the same frequency by the limiter 50.7. This square wave signal is the line digit rate clock. Edge triggered D-type flip flop 50.8 and 50.9, clocked at the line digit rate, are used to retime the outputs of comparator 50.2 and 50.3 to give the two regenerated binary streams. These two binary streams are deserialized in two 3-bit shift registers 51 and 52 and the ensuing 6-bit words constitute the input to the code translator 53 which may be implemented as disclosed in the above-cited U.S. Pat. No. 3,611,141. The translator output is four parallel binary digit streams $A_1$, $A_2$, $B_1$, $B_2$ as originally labelled in the multiplexer. These streams are serialized by serializing circuits 54 and 55 in two groups of two digits. These are then descrambled in a 10-stage, two-line parallel descrambler 56, thus recovering the two original stuffed tributaries A and B. Descrambler 56 may be implemented as disclosed in the above-cited first copending application.

Some aspect of the line code redundancy is used in the word alignment detector 59 to control the phase of the word rate clock output W of the divide by three circuit 57. In the case of 4B3T, line code word alignment can be found using the technique described in a second copending application Ser. No. 436,301, filed Jan. 24, 1974, whose disclosure is incorporated herein by reference. A typical implementation of this technique gives a mean time to find word alignment with worst case start of 75 words for random input data. This time is very short compared to many asynchronous multiplexers owing to the very much higher redundancy in the line code (16%), compared to that normally added to the data stream (about 1%).

Figure 6:
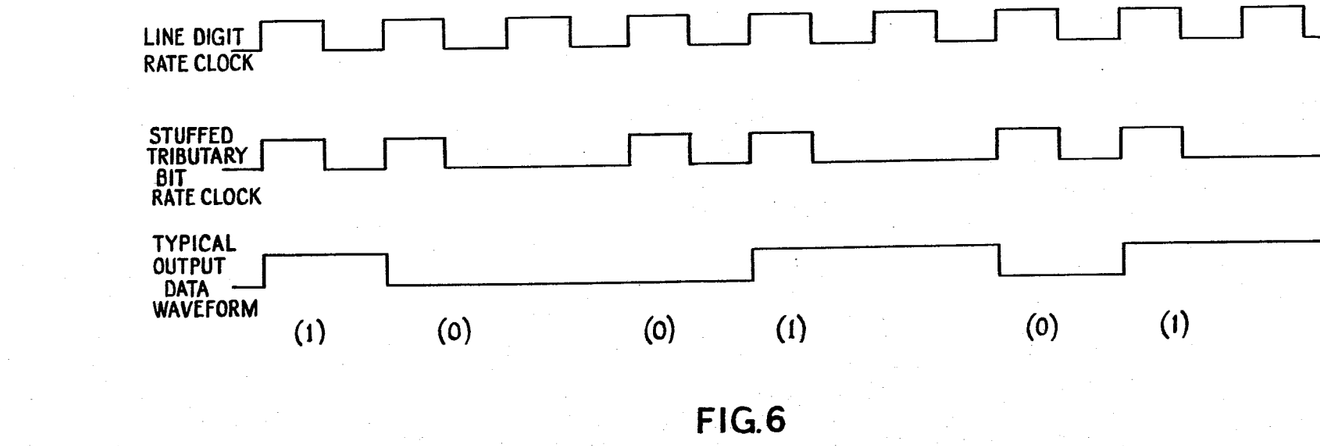
FIG. 6 illustrates irregular tributary clock and data waveforms.

The clock division circuit 58 generates a clock at the stuffed tributary digit rate ST which is two thirds of the ternary digit rate T. This is accomplished by gating of the word rate clock W with the ternary digit rate clock and in consequence this clock is irregular. A timing diagram (FIG. 6) shows the relationship between the line digit rate and stuffed tributary bit rate clocks, and a typical output data waveform.

While we have described above the principles of our invention in connection with specific apparatus it is to be clearly understood that this description is made only by way of example and not as a limitation to the scope of our invention as set forth in the objects thereof and in the accompanying claims.

We claim:
1. A digital data communication system comprising:
 transmitter means including
  a plurality of sources of serial digital data streams, each of said streams having data encoded according to a first multidigit digital code;

first means coupled to said sources to select from each of said streams a sub-group of successive digits;

second means coupled to said first means for transferring said sub-groups collectively to form a first group of digits;

third means coupled to said second means for translating said first group of digits into a second group of digits encoded according to a second multidigit digital code different than said first code; and fourth means coupled to said third means for transmitting said second group of digits; and receiver means including fifth means coupled to said fourth means to receive said second group of digits;

sixth means coupled to said fifth means for retranslating said second group of digits back into said first group of digits;

seventh means coupled to said sixth means for dividing said retranslated first group of digits into said sub-groups; and eighth means coupled to said seventh means for recreating from said sub-groups said streams;

said first means including a plurality of shift registers, each of said shift registers having a different one of said streams coupled thereto in serial form, each of said shift registers having a number of stages equal to the number of digits in the associated one of said sub-groups.

2. A system according to claim 1, wherein
said second means includes
ninth means for transferring simultaneously the contents of each of said shift registers in a parallel mode to said third means.

3. A system according to claim 2, wherein
said first group of digits are binary coded digits;
said second group of digits are ternary coded digits; and
said third means translates said first group of binary coded digits to said second group of ternary coded digits.

4. A system according to claim 3, wherein
said first group of binary coded digits number four binary coded digits;
said second group of ternary coded digits number three ternary coded digits; and
said third means translates said first group of four binary coded digits into said second group of three ternary coded digits.

5. A system according to claim 4, wherein
said third means includes
tenth means for monitoring a running digital sum of said group of ternary coded digits; and
eleventh means coupled to said tenth means for controlling the choice of alternate ternary coded words when such words are available to maintain said running digital sum within predetermined limits.

6. A system according to claim 1, wherein
said first group of digits are binary coded digits;
said second group of digits are ternary coded digits; and
said third means translates said first group of binary coded digits to said second group of ternary coded digits.

7. A system according to claim 6, wherein
said first group of binary coded digits number four binary coded digits;
said second group of ternary coded digits number three ternary coded digits; and
said third means translates said first group of four binary coded digits into said second group of three ternary coded digits.

8. A system according to claim 7, wherein
said third means includes
ninth means for monitoring a running digital sum of said group of ternary coded digits; and
tenth means coupled to said ninth means for controlling the choice of alternate ternary coded words when such words are available to maintain said running digital sum within predetermined limits.

9. A system according to claim 1, wherein
said first group of digits are binary coded digits;
said second group of digits are ternary coded digits; and
said third means translates said first group of binary coded digits to said second group of ternary coded digits.

10. A system according to claim 9, wherein
said first group of binary coded digits number four binary coded digits;
said second group of ternary coded digits number three ternary coded digits; and
said third means translates said first group of four binary coded digits into said second group of three ternary coded digits.

11. A system according to claim 10, wherein
said third means includes
ninth means for monitoring a running digital sum of said group of ternary coded digits; and
tenth means coupled to said ninth means for controlling the choice of alternate ternary coded words when such words are available to maintain said running digital sum within predetermined limits.

12. A system according to claim 1, wherein
said transmitter means further includes
ninth means coupled between said sources and said first means to scramble each of said streams; and
said receiving means further includes
tenth means coupled to the output of said eighth means to de-scramble each of said recreated streams.

13. A system according to claim 1, wherein
said transmitter means further includes
ninth means coupled to said sources to synchronize said streams which are initially asynchronous.

14. A system according to claim 13, wherein
said ninth means includes
tenth means coupled to said sources for adding stuffing digits to each of said streams; and
said receiver means further includes
eleventh means coupled to said eighth means for removing from said recreated streams said stuffing digits added at said transmitter means.

15. A digital data transmitter comprising:
a plurality of sources of serial digital data streams, each of said streams having data encoded according to a first digital code;
first means coupled to said sources to select from each of said streams a sub-group of successive digits;

second means coupled to said first means for transferring said sub-groups collectively to form a first group of digits;

third means coupled to said second means for translating said first group of digits into a second group of digits encoded according to a second digital code different than said first code; and fourth means coupled to said third means for transmitting said second group of digits;

said first means including
 a plurality of shift registers, each of said shift registers having a different one of said streams coupled thereto in serial form, each of said shift registers having a number of stages equal to the number of digits in the associated one of said sub-groups.

16. A transmitter according to claim 15, wherein said second means includes
 fifth means for transferring simultaneously the contents of each of said shift registers in a parallel mode to said third means.

17. A transmitter according to claim 16, wherein said first group of digits are binary coded digits,
said second group of digits are ternary coded digits, and
said third means translates said first group of binary coded digits to said second group of ternary coded digits.

18. A transmitter according to claim 17, wherein said first group of binary coded digits number four binary coded digits,
said second group of ternary coded digits number three ternary coded digits, and
said third means translates said first group of four binary coded digits into said second group of three ternary coded digits.

19. A transmitter according to claim 18, wherein said third means includes
 sixth means for monitoring a running digital sum of said group of ternary coded digits, and
 seventh means coupled to said sixth means for controlling the choice of alternate ternary coded words when such words are available to maintain said running digital sum within predetermined limits.

20. A transmitter according to claim 15, wherein said first group of digits are binary coded digits,
said second group of digits are ternary coded digits, and
said third means translates said first group of binary coded digits to said second group of ternary coded digits.

21. A transmitter according to claim 20, wherein said first group of binary coded digits number four binary coded digits,
said second group of ternary coded digits number three ternary coded digits, and
said third means translates said first group of four binary coded digits into said second group of three ternary coded digits.

22. A transmitter according to claim 21, wherein said third means includes
 fifth means for monitoring a running digital sum of said group of ternary coded digits, and
 sixth means coupled to said fifth means for controlling the choice of alternate ternary coded words when such words are available to maintain said running digital sum within predetermined limits.

23. A transmitter according to claim 15, wherein said first group of digits are binary coded digits,
said second group of digits are ternary coded digits, and
said third means translates said first group of binary coded digits to said second group of ternary coded digits.

24. A transmitter according to claim 23, wherein said first group of binary coded digits number four binary coded digits,
said second group of ternary coded digits number three ternary coded digits, and
said third means translates said first group of four binary coded digits into said second group of three ternary coded digits.

25. A transmitter according to claim 24, wherein said third means includes
 fifth means for monitoring a running digital sum of said group of ternary coded digits, and
 sixth means coupled to said fifth means for controlling the choice of alternate ternary coded words when such words are available to maintain said running digital sum within predetermined limits.

26. A transmitter according to claim 15, wherein said transmitter means further includes
 fifth means coupled between said sources and said first means to scramble each of said streams.

27. A transmitter according to claim 15, wherein said transmitter means further includes
 fifth means coupled to said sources to synchronize said streams which are initially asynchronous.

* * * * *